Peter Broadbooks' Carriage Spring.

117253

PATENTED JUL 25 1871

Witnesses,
H. a. Daniels
Al Farner

Peter Broadbooks, Inventor,
by C. S. Whitman, Attorney,
529 Seventh St,
Washington, D. C.

117,253

UNITED STATES PATENT OFFICE.

PETER BROADBOOKS, OF BATAVIA, NEW YORK.

IMPROVEMENT IN CARRIAGE-SPRINGS.

Specification forming part of Letters Patent No. 117,253, dated July 25, 1871.

*To all whom it may concern:*

Be it known that I, PETER BROADBOOKS, of Batavia, in the county of Genesee and in the State of New York, have invented an Improvement in Carriage-Springs; and do hereby declare that the following description, taken in connection with the accompanying drawing hereinafter referred to, forms a full and exact specification of the same, wherein I have set forth the nature and principles of my said improvement, by which my invention may be distinguished from others of a similar class, together with such parts as I claim and desire to secure by Letters Patent.

My invention relates to that class of carriage-springs which is elliptical in form and jointed together at either end; and the nature thereof consists in certain modifications and improvements in the details of the construction of the same, hereinafter described and shown.

Figure 1:
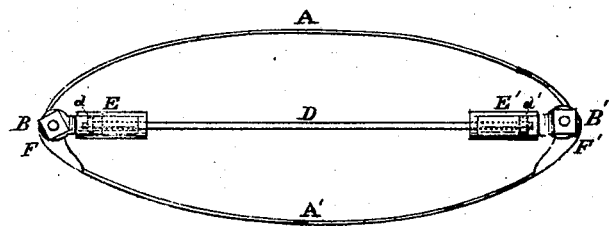
Figure 2:
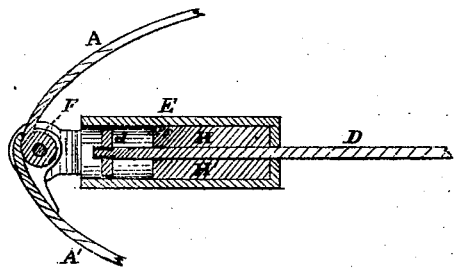

In the accompanying drawing, which illustrates my invention and forms a part of the specification, in which corresponding parts are illustrated by similar letters, Figure 1 is a longitudinal elevation of the spring. Fig. 2 is a view in detail illustrating the auxiliary rubber spring.

The construction and operation of my invention are as follows:

In the drawing, A A' illustrate the parts of an elliptical spring jointed together at the ends thereof by means of the bolts and nuts B B'. The auxiliary spring consists of the rod D, cylinders E E', clevises F F', and rubber packings H H'. The rod D passes through a perforation cut in the rubber packings H H', and is secured in position by means of the nuts $d$ $d'$ on the ends thereof. The clevis F F' is secured to the elliptical spring by means of the screw and bolt B B', by which the parts thereof are jointed together.

The operation and advantages of the invention will be sufficiently obvious from the foregoing description without further comment.

I am aware that auxiliary springs have heretofore been used between the bars of elliptical springs.

I therefore claim—

The construction and arrangement of the elliptical spring A A', rod D, cylinders E E', rubber packings H H', nuts B B', and clevises F F', when operating together, as and for the purpose described.

In testimony that I claim the foregoing I have hereunto set my hand and seal this 17th day of December, 1870.

PETER BROADBOOKS. [L. S.]

Witnesses:
A. COWDIN,
R. F. THOMPSON.